(12) United States Patent
Kawamura et al.

(10) Patent No.: US 7,321,530 B2
(45) Date of Patent: Jan. 22, 2008

(54) DECODER CIRCUIT, AND PHOTO-DETECTING AMPLIFIER CIRCUIT AND OPTICAL PICKUP INCLUDING THE DECODER CIRCUIT FOR DISK RECORDING/REPRODUCING APPARATUS

(75) Inventors: Katsuyuki Kawamura, Nara (JP); Yasuyuki Shirasaka, Sakai (JP)

(73) Assignee: Sharp Kabushiki Kaisha, Osaka (JP)

( * ) Notice: Subject to any disclaimer, the term of this patent is extended or adjusted under 35 U.S.C. 154(b) by 533 days.

(21) Appl. No.: 10/830,213

(22) Filed: Apr. 21, 2004

(65) Prior Publication Data

US 2004/0264335 A1     Dec. 30, 2004

(30) Foreign Application Priority Data

Apr. 25, 2003   (JP) .............................. 2003-122840

(51) Int. Cl.
   *G11B 7/00* (2006.01)
(52) U.S. Cl. .................................. 369/47.19
(58) Field of Classification Search ...................... None
   See application file for complete search history.

(56) References Cited

U.S. PATENT DOCUMENTS

| 4,424,732 | A | * | 1/1984 | Imamura et al. ............... 84/684 |
| 4,465,944 | A |   | 8/1984 | Shin |
| 5,039,882 | A | * | 8/1991 | Arakawa ..................... 326/106 |
| 5,418,762 | A | * | 5/1995 | Kitayama ................ 369/13.02 |
| 5,638,029 | A | * | 6/1997 | O'Shaughnessy ............ 331/44 |
| 5,854,772 | A | * | 12/1998 | Suzu ..................... 365/230.06 |
| 5,999,464 | A | * | 12/1999 | Hidaka et al. .............. 365/200 |

FOREIGN PATENT DOCUMENTS

| JP | 60-062239 | 4/1985 |
| JP | 61-182327 | 8/1986 |
| JP | 2-6684 | 2/1990 |
| JP | 06-090126 | 3/1994 |
| JP | 2000-236251 | 8/2000 |

* cited by examiner

*Primary Examiner*—Wayne Young
*Assistant Examiner*—Parul Gupta
(74) *Attorney, Agent, or Firm*—Morrison & Foerster LLP (57) ABSTRACT

A decoder circuit of the present invention, mounted on an integrated circuit, decodes input voltage Vin supplied to a single external input terminal into three or more control outputs, and an object of the present invention is to reduce the size of a chip. The foregoing decoder circuit includes: a P-type transistor in which an emitter is connected to a power source line of high level, a base is connected to the external input terminal, and a collector is an output terminal of a first control output; and an N-type transistor in which an emitter is connected to a power source line of low level, a base is connected to the external input terminal, and a collector is an output terminal of a second control output, and decodes the control outputs to three or more sets of data by carrying out logic operations. Therefore, as compared to the case of using a comparator requiring many transistors, a constant current source, and other elements, one each transistor is required for each of the two control outputs to be generated. This facilitates size reduction of a chip.

4 Claims, 6 Drawing Sheets

DECODER CIRCUIT, AND PHOTO-DETECTING AMPLIFIER CIRCUIT AND OPTICAL PICKUP INCLUDING THE DECODER CIRCUIT FOR DISK RECORDING/REPRODUCING APPARATUS

This Nonprovisional application claims priority under 35 U.S.C. § 119(a) on Patent Application No. 2003/122840 filed in Japan on Apr. 25, 2003, the entire contents of which are hereby incorporated by reference.

FIELD OF THE INVENTION

The present invention relates particularly to a decoder circuit, which is preferably mounted for a photo-detecting amplifier circuit, and the like in an optical pickup of a disk recording/reproducing apparatus, enabling switching among three or more operation modes in accordance with an input voltage supplied to a single external input terminal, and relates to a photo-detecting amplifier circuit and an optical pickup including the decoder circuit.

BACKGROUND OF THE INVENTION

With support for writing by CD drives and DVD drives, there is increasing demand for many operation modes corresponding to reading and writing operations, with respect to a photo-detecting amplifier circuit of the optical pickup. For example, for a small signal upon reading and a large signal upon writing, the photo-detecting amplifier requires gain switching between two levels. Further, in addition to two conventional modes for the gain switching, one more mode is required for the followings: support for recording media of different reflectivities in DVD drives and the like, and standby function for lower power consumption in portable devices, for example.

Meanwhile, for the photo-detecting amplifier circuit mounted on an integrated circuit, an external input terminal and a chip area are closely related to each other. More specifically, if a terminal is arranged outside, a wire bonding area is required on a chip for the connection to a frame of a package. The wire bonding area is about 150 μm per side, depending on equipment for bonding and a manufacturing process for semiconductors. In contrast, one transistor area is about 20 μm per side, and the size of the wire bonding area is therefore fifty or more times than that of the transistor area. Further, the width of a terminal wired on the chip is about several micrometers. Thus, decrease of a terminal arranged outside brings about a dramatic effect on size reduction of a chip.

For the realization of switching among three or more operation modes, a photo-detecting amplifier circuit achieving size reduction of a chip by means of a decoder circuit is suggested. In this case, only one input signal is required, although two or more input signals are required in the conventional art, and size reduction of a chip is realized by using a decoder circuit which decodes an input voltage supplied to a single external input terminal into three or more control outputs.

Figure 7:
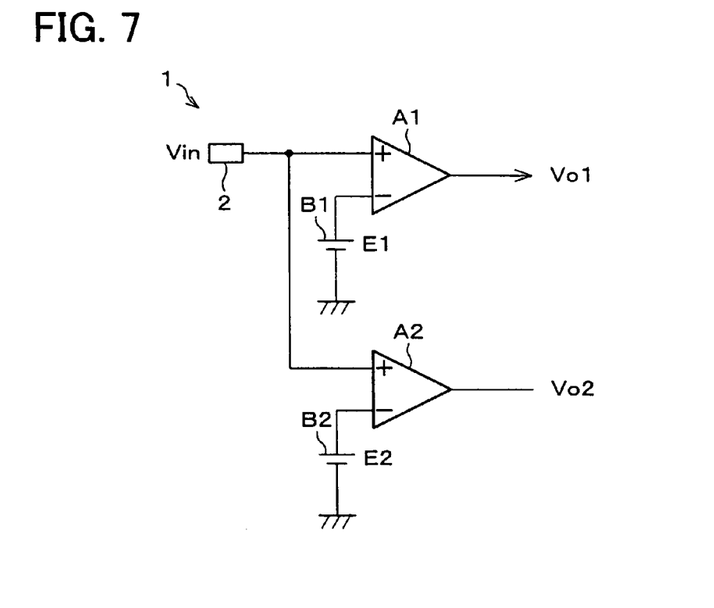
FIG. 7 is a block diagram showing an electrical arrangement of a typical decoder circuit of the conventional art.

FIG. 7 is a block diagram showing an electrical arrangement of a typical decoder circuit 1 of the conventional art. The decoder circuit 1 includes two comparators A1 and A2 and reference voltage sources B1 and B2 respectively corresponding to the comparators A1 and A2. An input voltage Vin which is provided to a single external input terminal 2 is supplied to respective positive input terminals of the two comparators A1 and A2. To respective negative input terminals of the comparators A1 and A2, reference voltages E1 and E2 are supplied from the reference voltage sources B1 and B2. When the input voltage Vin is more than the reference voltages E1 and E2, the comparators A1 and A2 produce high-level output voltages Vo1 and Vo2, respectively. On the other hand, when the input voltage Vin is less than the reference voltages E1 and E2, the comparators A1 and A2 produce low-level output voltages Vo1 and Vo2, respectively.

This arrangement realizes a window comparator for determining the following three states: Vin>E1, E1>Vin>E2, and Vin<E2, where the two reference voltages E1 and E2 are threshold voltages, and it is E1>E2. By carrying out an operation in accordance with two outputs Vo1 and Vo2, it is possible to detect three states. For example, gain switching for a photo-detecting amplifier is performed using the first control output Vo1, and control for on/off of the standby function of the photo-detecting amplifier is performed using the second control output Vo2.

Figure 8:
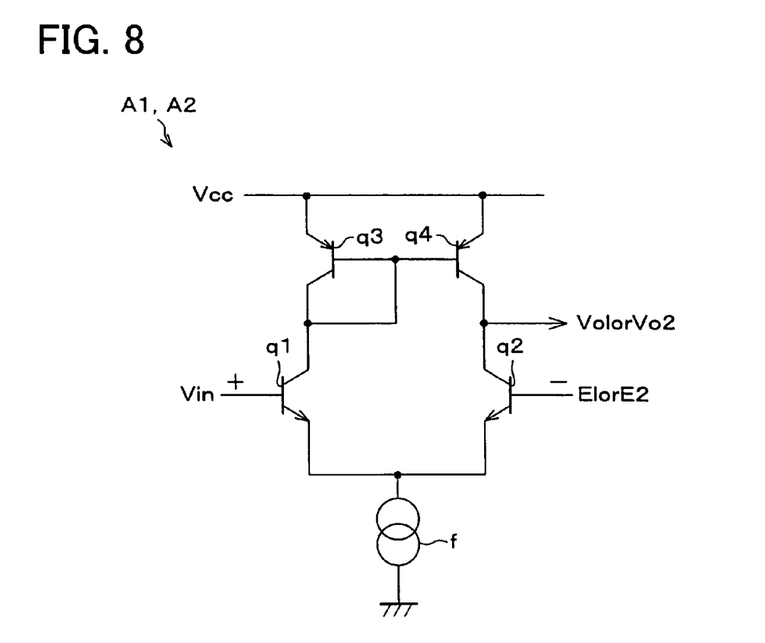
FIG. 8 is an electrical diagram showing an example of the arrangement of comparators in the decoder circuit shown in FIG. 7.

FIG. 8 is an electrical diagram showing an example of the arrangement of the comparators A1 and A2. These comparators A1 and A2 include N-type transistors q1 and q2, P-type transistors q3 and q4, and a constant current source f. In the transistors q1 and q2, their emitters are grounded via the constant current source f, their bases are respectively positive and negative input terminals, and their collectors are connected to a power source line of high level Vcc via the transistors q3 and q4 which is active load. With this arrangement, a contact of the collectors of the transistors q2 and q4 becomes an output terminal, and when the input voltage Vin is more than the reference voltages E1 and E2, the comparators A1 and A2 produce high-level output voltages Vo1 and Vo2, respectively. On the other hand, when the input voltage Vin is less than the reference voltages E1 and E2, the comparators A1 and A2 produce low-level output voltages Vo1 and Vo2, respectively.

As other conventional art, Japanese Laid-Open Patent Application No. 2000-236251 (Tokukai 2000-236251; published on Aug. 29, 2000) discloses that using a differential couple and a constant current source, three different current values are outputted from a single output terminal with respect to three inputs supplied to a single external input terminal. Japanese Utility Model Publication No. 2-6684/1990 (Jitsukouhei 2-6684; published on Feb. 19, 1990) discloses that one transistor of the transistors making up a differential couple in a first differential amplifier is provided with a second differential amplifier, thereby realizing one input and three outputs with one constant current source and realizing lower-power consumption.

As described above, the conventional circuit configuration requires two external input terminals or two comparators (differential amplifier), which arises the problem of difficulty in size reduction of a chip.

SUMMARY OF THE INVENTION

An object of the present invention is to provide a decoder circuit facilitating size reduction of a chip (die), and a photo-detecting amplifier circuit and an optical pickup including the decoder circuit for disk recording/reproducing apparatus.

In order to achieve the above object, a decoder circuit of the present invention, which is mounted on an integrated circuit, decoding an input voltage supplied to a single external input terminal into three or more control outputs, includes: a P-type transistor in which an emitter (source) is connected to a power source line of high level, a base (gate)

is connected to the external input terminal, and a collector (drain) is an output terminal of a first control output; and an N-type transistor in which an emitter (source) is connected to a power source line of low level, a base (gate) is connected to the external input terminal, and a collector (drain) is an output terminal of a second control output.

The foregoing decoder circuit, which is mounted on an integrated circuit, is provided for size reduction of a chip, and decodes an input voltage supplied to a single external input terminal into three or more control outputs, not two control outputs as On and Off. Specifically, the foregoing decoder circuit includes a P-type transistor and an N-type transistor provided in parallel to the external input terminal and having different polarities, and realizes the three or more control outputs using two control outputs each from the respective collectors (drain) of the P-type and N-type transistors.

More specifically, in the P-type transistor, the emitter (source) is connected to a power source line of high level, the base (gate) is connected to the external input terminal, and the collector (drain) behaves as an output terminal of a first control output. Further, in the N-type transistor, the emitter (source) is connected to a power source line of low level, the base (gate) is connected to the external input terminal, and the collector (drain) behaves as an output terminal of a second control output.

Therefore, as compared to the case of using a comparator requiring many transistors, a constant current source, and other elements, one each transistor is required for each of the first and second control outputs to be generated. This further facilitates size reduction of a chip.

Further, a photo-detecting amplifier circuit of the present invention for a disk recording/reproducing apparatus is capable of switch function by means of the foregoing decoder circuit.

According to the above arrangement, it is possible to reduce the size of a chip and to realize a photo-detecting amplifier circuit being capable of switch function for switching to the standby mode.

Still further, an optical pickup of the present invention includes the foregoing photo-detecting amplifier circuit.

According to the above arrangement, it is possible to reduce the size of a chip and to realize an optical pickup including a photo-detecting amplifier circuit being capable of switch function for switching to the standby mode.

For a fuller understanding of the nature and advantages of the invention, reference should be made to the ensuing detailed description taken in conjunction with the accompanying drawings.

DESCRIPTION OF THE EMBODIMENTS

Figure 1:
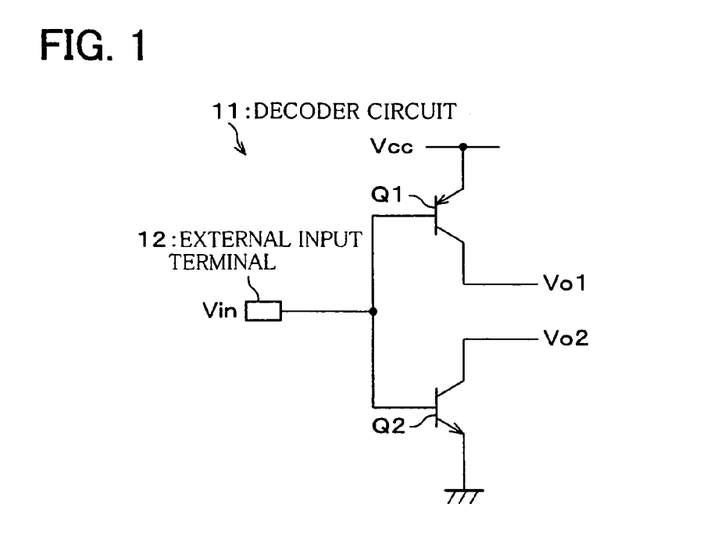
FIG. 1 is an electrical diagram of a decoder circuit according to one embodiment of the present invention.

The following will describe one embodiment of the present invention with reference to FIG. 1.

FIG. 1 shows an electrical diagram of a decoder circuit 11 according to one embodiment of the present invention. The decoder circuit 11 is provided for size reduction of a chip for an integrated circuit of a photo-detecting amplifier circuit in an optical pickup, and decodes an input voltage Vin supplied to a single external input terminal 12 into three or more control outputs, not two control outputs as On and Off.

The decoder circuit 11 includes two transistors, P-type transistor Q1 and N-type transistor Q2. The input voltage Vin supplied to the single external input terminal 12 is supplied to bases of the two transistors Q1 and Q2. An emitter of the P-type transistor Q1 is connected to a power source line of high level Vcc, and a collector of the transistor Q1 is an output terminal of a first control output Vo1. An emitter of the N-type transistor Q2 is connected to a power source line of low level GND, and a collector of the transistor Q2 is an output terminal of a second control output Vo2.

The decoder circuit 11 having the foregoing arrangement performs operations in the following three regions. In the case where the input voltage Vin is a low voltage, the transistor Q2 operates in a nonactive region, and the transistor Q1 operates in an active region. In the case where the input voltage Vin is a high voltage, the transistor Q2 operates in the active region, and the transistor Q1 operates in the nonactive region. In the case where the input voltage Vin is at an intermediate potential and at an open potential (high impedance), both of the transistors Q1 and Q2 operate in the active region or in the nonactive region. By carrying out an operation in accordance with two outputs Vo1 and Vo2, it is possible to detect three states. For example, gain switching for a photo-detecting amplifier is performed using the first control output Vo1, and control for on/off of the standby function of a photo-detecting amplifier is performed using the second control output Vo2.

Here, the input voltage Vin, which is an external control signal, is actually generated by a microcomputer or the like, and if switching is performed with the external control signal, accurate threshold values such as the accurate reference voltages E1 and E2 are not necessary. For example, when the microcomputer can produce a low voltage output, the output, depending on specification, is several hundred millivolts above GND potential; however, there is no problem if switching control is possible within that voltage range (in the state where the N-type transistor is not active in the present embodiment).

As described previously, in the case of the input voltage Vin at an intermediate potential and at an open potential, the transistors Q1 and Q2 in the nonactive region can reduce the consumption of currents, so that it is preferable for the uses of portable devices in standby mode. However, although there may be cases where it is difficult that both of the transistors Q1 and Q2 are in the nonactive region depending on the specifications of power source voltage Vcc and of the input voltage Vin, which is an external control signal, desired circuit operations can be realized even in such cases.

As described above, as compared with the comparator requiring many transistors and a constant current source, one each transistor can be used for each of the first control output Vo1 and the second control output Vo2 to be generated. In addition to the adoption of the single external input terminal 12, area reduction of a circuit further facilitates size reduction of a chip, thus realizing size reduction of an integrated circuit.

Figure 2:
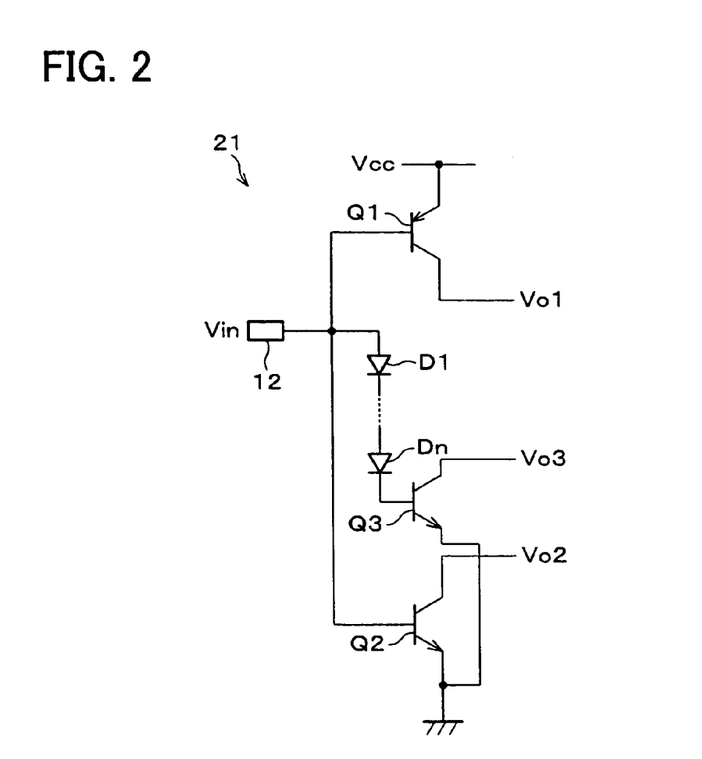
FIG. 2 is an electrical diagram of a decoder circuit according to another embodiment of the present invention.
Figure 3:
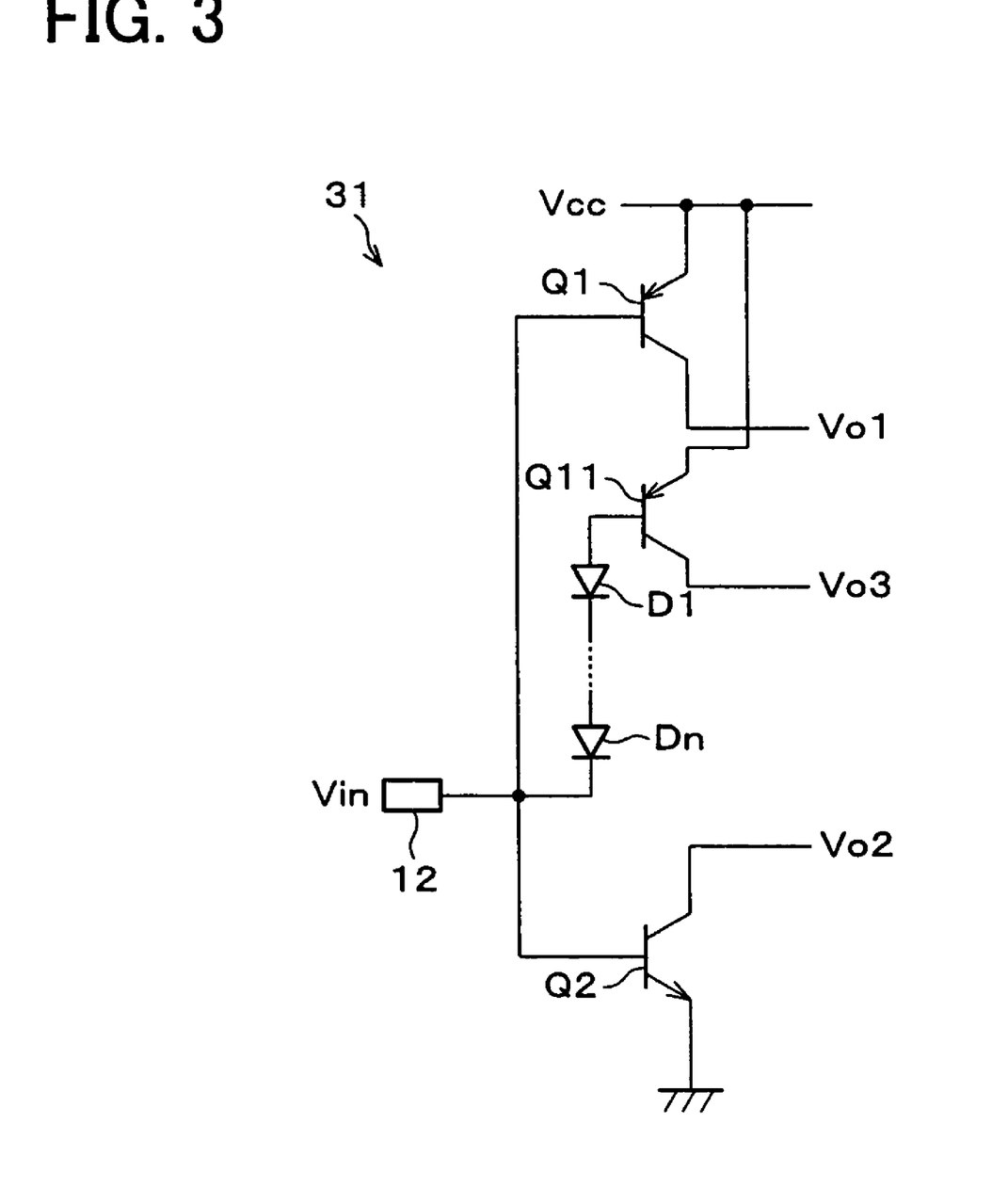
FIG. 3 is an electrical diagram of a decoder circuit according to still another embodiment of the present invention.

The following will describe another embodiment of the present invention with reference to FIGS. 2 and 3.

FIG. 2 is an electrical diagram of a decoder circuit 21 according to another embodiment of the present invention. The decoder circuit 21 is similar to the foregoing decoder circuit 11, and members having the same functions as those of the decoder circuit 11 are given the same reference numerals and explanations thereof are omitted here. Note that, the decoder circuit 21 is provided with another N-type transistor Q3, in addition to the two transistors Q1 and Q2. Moreover, to correspond to this arrangement, the decoder circuit 21 is also provided with diodes D1-Dn (n is a given number) connected in series.

The external input terminal 12 is connected to an anode of the diode D1, and a cathode of the diode Dn is connected to a base of the transistor Q3. An emitter of the transistor Q3 and an emitter of the transistor Q2, both of which are N-type transistors, are connected to the power source line of low level GND, and a collector of the transistor Q3 is an output terminal of a third control output Vo3.

Further, FIG. 3 is an electrical diagram of a decoder circuit 31 according to still another embodiment of the present invention. The decoder circuit 31 is provided with another P-type transistor Q11, in addition to the two transistors Q1 and Q2. To correspond to this arrangement, the external input terminal 12 is connected to a cathode of a diode Dn, and an anode of the diode D1 is connected to a base of the transistor Q11. An emitter of the transistor Q11 and an emitter of the transistor Q1, both of which are P-type transistors, are connected to the power source line of high level Vcc, and a collector of the transistor Q11 is an output terminal of the third control output Vo3.

In the case where a plurality of the transistor Q3 or Q11 is provided, their bases are respectively connected to contacts of the diodes D1-Dn. In this manner, output terminals for three or more control outputs can be generated. Logic for operations of the transistors Q3 and Q11 can be arbitrarily set in accordance with a DC source voltage Vcc, the input voltage Vin supplied to the external input terminal 12, and the number of diodes D1-Dn.

Figure 4:
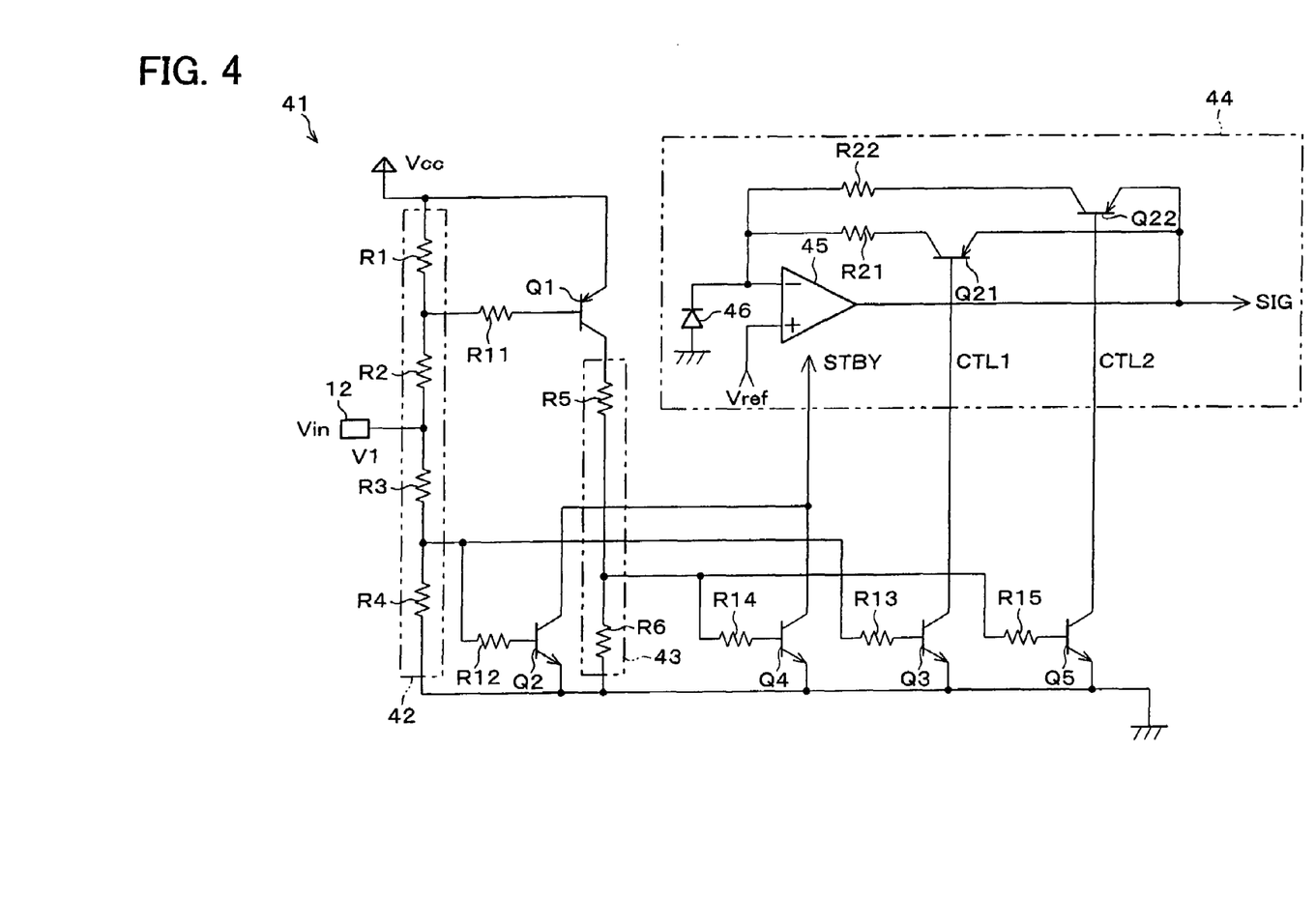
FIG. 4 is an electrical diagram of a decoder circuit according to yet another embodiment of the present invention.
Figure 5:
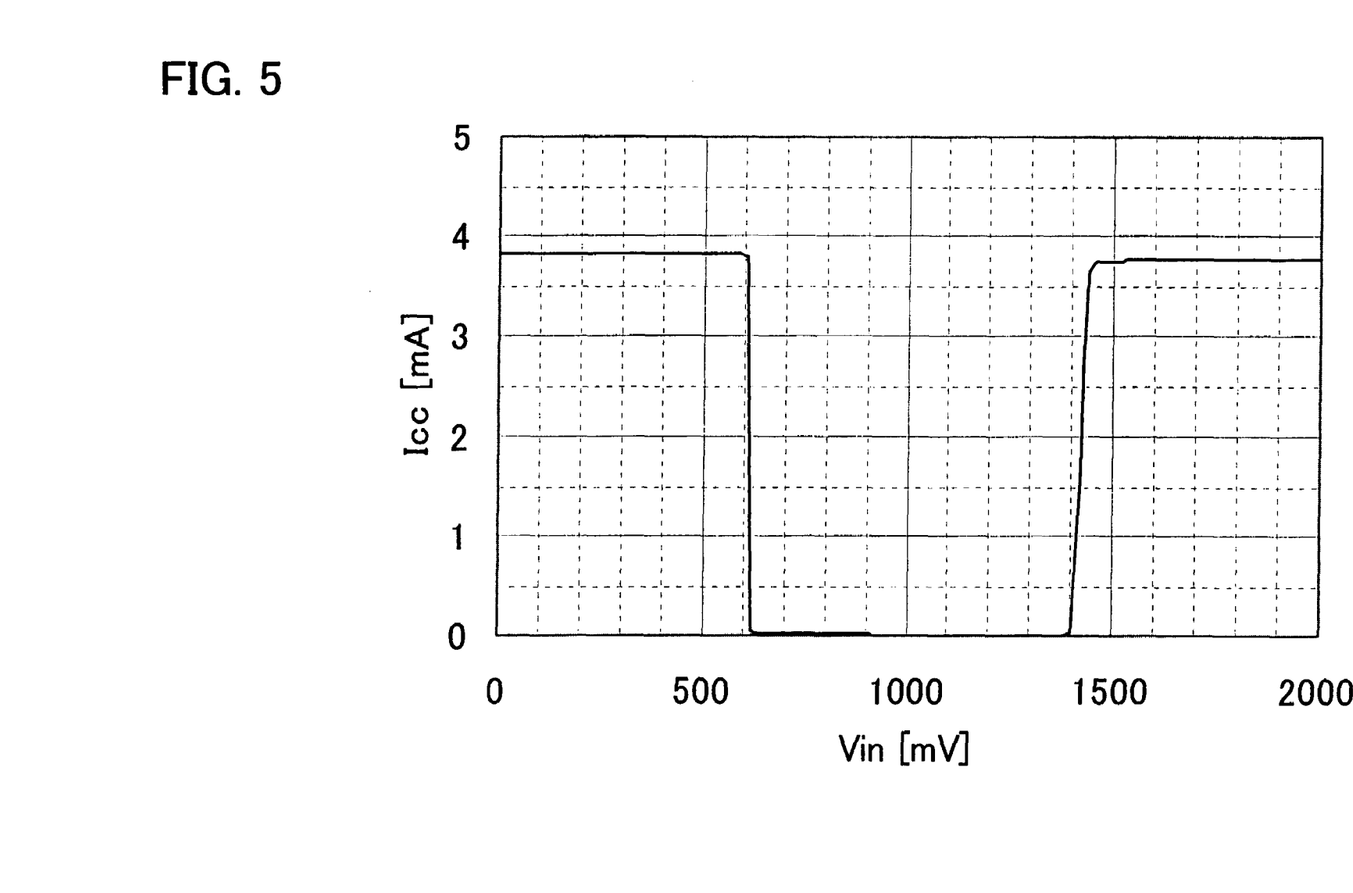
FIG. 5 is a wave form chart showing a result of simulation on changes of source current in the photo-detecting amplifier circuit with respect to the input voltage by the decoder circuit shown in FIG. 4.

The following will describe yet another embodiment of the present invention with reference to FIGS. 4 and 5.

FIG. 4 is an electrical diagram of a decoder circuit 41 according to yet another embodiment of the present invention. The decoder circuit 41 is similar to the foregoing decoder circuit 11, and members having the same functions as those of the decoder circuit 11 are given the same reference numerals and explanations thereof are omitted here. Note that, the decoder circuit 41 is provided with, in addition to the two transistors Q1 and Q2, a first voltage dividing circuit 42 consisting of four voltage-dividing resistors R1-R4, a second voltage-dividing circuit 43 consisting of two voltage-dividing resisters R5 and R6, three N-type transistors Q3-Q5, and bias resistors R11-R15 of the transistors Q1-Q5.

The four voltage-dividing resistors R1-R4 are connected in series between the power source lines. The external input terminal 12 is connected to a first contact of the voltage-dividing resistors R2 and R3, which is a midpoint of the four voltage-dividing resistors R1-R4. The base of the transistor Q1 is connected via the bias resistor R11 to a second contact of the voltage-dividing resistors R1 and R2, having a voltage level higher than that of the first contact. The base of the transistor Q2 is connected via the bias resistor R12 to a third contact of the voltage-dividing resistors R3 and R4, having a voltage level lower than that of the fist contact.

Therefore, as described previously, the two transistors Q1 and Q2 generally perform opposite operations. The current taken in the transistor Q1 is supplied to the second voltage-dividing circuit 43. In the second voltage-dividing circuit 43, the current is limited to reduce a consumed current in the transistor Q1, and is converted into voltage, and the converted voltage is divided.

A base of the transistor Q3 is connected via the bias resistor R13 to the third contact of the voltage-dividing resistors R3 and R4. Bases of the transistors Q4 and Q5 are connected via the bias resistors R14 and R15 to a contact of the voltage-dividing resistors R5 and R6 in the second voltage-dividing circuit 43. Emitters of the transistors Q2-Q5 are connected to the power source line of low level GND.

The collectors of the transistors Q2 and Q4 are the output terminal of a standby signal STBY. A collector of the transistor Q3 behaves as an output terminal of a first gain switching signal CTL1. A collector of the transistor Q5 is an output terminal of a second gain switching signal CTL2. For example, the voltage-dividing resistors R1-R6 each has a resistance of 40 kΩ, and the bias resistors R11-R15 each has a resistance of 10 kΩ.

A photo-detecting amplifier circuit 44 includes an amplifier 45, a photodiode 46, two P-type transistors Q21 and Q22, and two feedback resistors R21 and R22. The photodiode 46 is connected to a negative input terminal of the amplifier 45, and reference voltage Vref is supplied to a positive input terminal of the amplifier 45. The amplifier 45 performs current-voltage conversion of photocurrent produced by the photodiode 46, amplifies the converted voltage in accordance with the reference voltage Vref, and outputs a detected signal SIG to a signal processing circuit and other (not shown). With this arrangement, information stored in an optical disk is read out, and tracking servo and focusing servo are performed.

Further, the detected signal SIG is subjected to negative-feedback via a first feedback circuit consisting of the transistor Q21 and the feedback resistor R21, or a second feedback circuit consisting of the transistor Q22 and the feedback resistor R22. The transistor Q21 turns on or off in accordance with the first gain switching signal CTL1. The transistor Q22 turns on or off in accordance with the second gain switching signal CTL2. A resistance of the feedback resistor R21 is lower than that of the feedback resistor R22. Therefore, when the transistor Q21 turns on (the first gain switching signal CTL1 goes active LOW), the photo-detecting amplifier circuit 44 has a high gain. When the transistor Q22 turns on, the photo-detecting amplifier circuit 44 has a low gain.

When the standby signal STBY goes active LOW, the amplifier 45 operates in the active region, and when the standby signal STBY goes nonactive OPEN, the amplifier 45 operates in the nonactive region.

In the decoder circuit 41 and the photo-detecting amplifier circuit 44 each having such an arrangement as described above, when the input voltage Vin, which is the external control signal, is at a high potential, the transistor Q2 operates in the active region, and the standby signal STBY goes active LOW, which activates a bias circuit of the photo-detecting amplifier circuit 44. Also, the transistor Q3 operates in the active region, and the first gain switching signal CTL1 goes active LOW, which turns the transistor Q21 on, and the photo-detecting amplifier circuit 44 has the high gain corresponding to reading operation or other operation. However, the transistor Q1 operates in the nonactive region, and the transistors Q4 and Q5 pulled down by the voltage-dividing resistor R6 therefore operate in the nonactive region.

On the other hand, when the input voltage Vin is at a low potential, the transistor Q1 operates in the active region, and the transistor Q4 also operates in the active region because the transistor Q1 activates the transistor Q4. Then, the standby signal STBY goes active LOW, which activates the bias circuit of the photo-detecting amplifier circuit 44. Also, the transistor Q5 operates in the active region, and the second gain switching signal CTL2 goes active LOW, which turns the transistor Q22 on, and the photo-detecting amplifier circuit 44 has the low gain corresponding to writing operation or other operation. However, the transistors Q2 and Q3 operate in the nonactive region.

When the input voltage Vin is at an intermediate potential, all of the transistors Q1-Q5 operate in the nonactive region. The standby signal STBY goes nonactive OPEN, which does not activate a bias circuit. The gain switching signals CTL1 and CTL2 also go nonactive OPEN, and gain switching is not performed. Thus, the photo-detecting amplifier circuit 44 enters the standby mode.

FIG. 5 shows a result of simulation on changes of source current Icc with respect to the input voltage Vin in the photo-detecting amplifier circuit 44. As seen from FIG. 5, when the input voltage Vin is at a low potential, the photo-detecting amplifier circuit 44 operates in the active region (in a low gain state). When the input voltage Vin is at an intermediate potential, the photo-detecting amplifier circuit 44 enters the standby mode because the source current Icc is reduced. When the input voltage Vin is at a high potential, the photo-detecting amplifier circuit 44 operates in the active region (in a high gain state).

In such a manner, the input voltage Vin supplied to the single external input terminal 12 is switched among high potential, low potential, and intermediate potential, whereby switching of the feedback resistors R21 and R22 in the amplifier 45 is performed in accordance with control outputs from the output terminals of the transistors Q2-Q5. This enables switching between the high gain and the low gain, and switching to the standby mode in the circuit. Thus, switching among three or more operating states can be performed in accordance with the input voltage Vin supplied to the single external input terminal 12.

The gain switching may be performed from high gain, intermediate gain, and low gain. Further, the input voltage Vin may be switched among from the high potential, the low potential, and open potential (high impedance). Increase in the number of transistors increases the number of output terminals. Logic for operations of the transistors can be set in accordance with a DC source voltage Vcc, the input voltage Vin supplied to the external input terminal 12, a resistance division ratio of the first and second voltage-dividing circuits 42 and 43, and the values of the bias resistors R11-R15.

Figure 6:
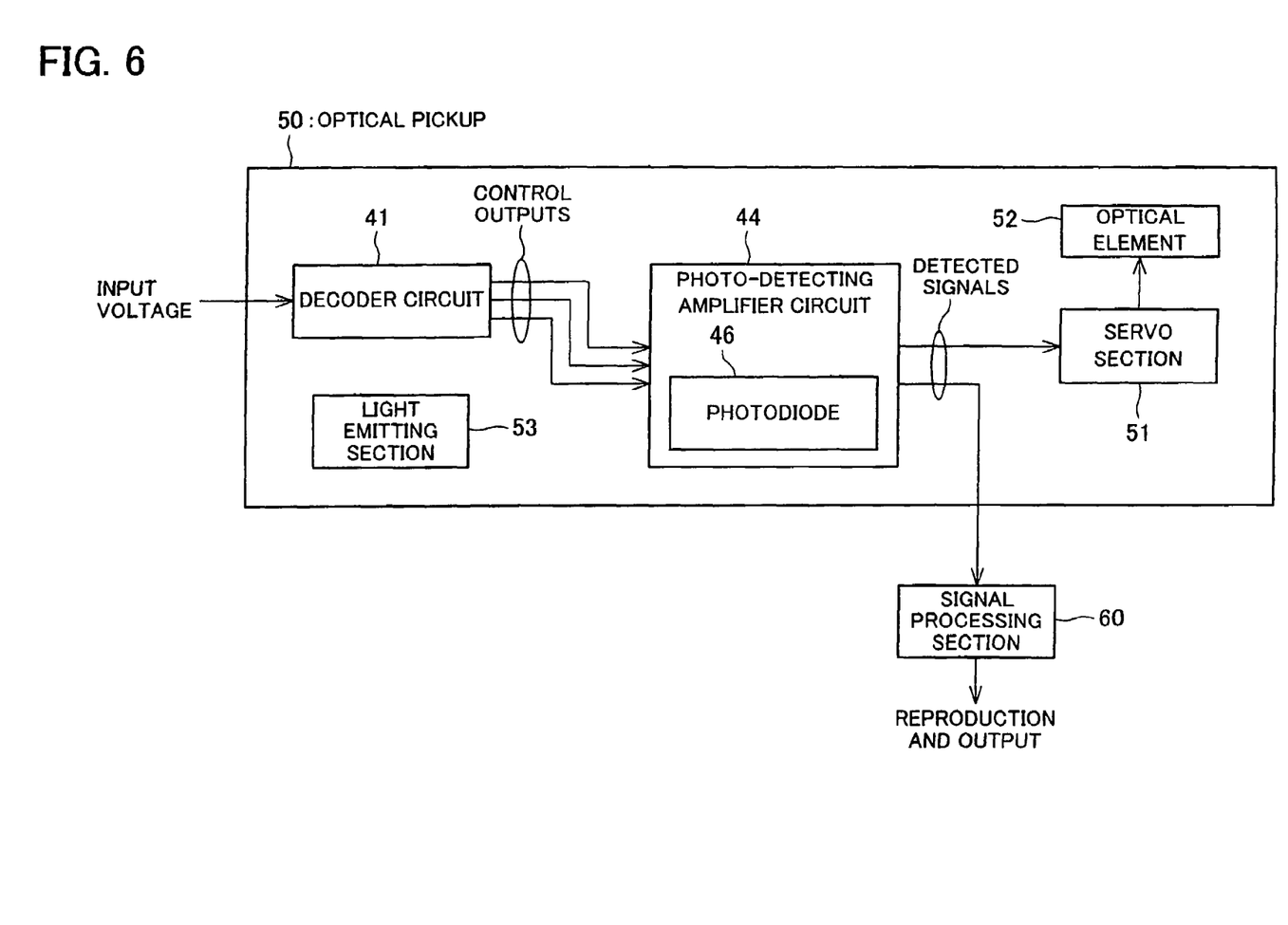
FIG. 6 is a block diagram schematically showing one example of an optical pickup of the present invention.

Here, the following will describe an optical pickup according to one embodiment of the present invention with reference to FIG. 6.

An optical pickup 50 includes: a servo section 51, an optical element 52, and a light-emitting section 53, in addition to the decoder circuit 41 and the photo-detecting amplifier circuit 44. The optical pickup 50 outputs a detected signal obtained in accordance with input voltage to the signal processing section 60. The signal processing section 60 performs reproduction and output in accordance with the detected signal.

The servo section 51 performs servo process for adjusting the position of the optical element 52, for example, in accordance with the detected signal supplied to the servo section 51. The optical element 52 is a lens, for example. The light-emitting section 53 is one to emit light onto an optical disk.

When the input voltage is supplied to the decoder circuit 41 in the optical pickup 50, three or more control outputs are supplied to the photo-detecting amplifier circuit 44, as described previously. The photo-detecting amplifier circuit 44 outputs a signal detected by the photodiode 46 as the detected signal, in accordance with control output, to the servo section 51 and the signal processing section 60.

Note that, the transistor in the description of the foregoing embodiment may be a MOS transistor, or a bipolar transistor.

As described above, a decoder circuit of the present invention, which is mounted on an integrated circuit, decoding an input voltage supplied to a single external input terminal into three or more control outputs, includes: a P-type transistor in which an emitter (source) is connected to a power source line of high level, a base (gate) is connected to the external input terminal, and a collector (drain) is an output terminal of a first control output; and an N-type transistor in which an emitter (source) is connected to a power source line of low level, a base (gate) is connected to the external input terminal, and a collector (drain) is an output terminal of a second control output.

According to the above arrangement, the three or more control outputs are realized using two control outputs each from the respective collectors (drains) of the P-type and N-type transistors.

Therefore, as compared to the case of using a comparator requiring many transistors, a constant current source, and other elements, one each transistor is required for each of the first and second control outputs to be generated. This further facilitates size reduction of a chip.

Further, the foregoing decoder circuit may be arranged so as to further include: one or more voltage decreasing means of which one end is connected to the external input terminal; and one or more first additional transistor in which a base (gate) is connected to the other end of the voltage decreasing means or to one of contacts of the voltage decreasing means, and an emitter (source) is connected to a power source line of high level or low level, and a collector (drain) is an output terminal of a control output.

According to the above arrangement, to the external input terminal, one or more voltage decreasing means such as diode is connected in series. To the other end of the voltage decreasing means, a base (gate) of a first additional transistor is connected. In the case where a plurality of first additional transistors is provided, the base (gate) of the first additional transistor is connected to one of contacts of the voltage decreasing means. The emitter (source) of the first additional transistor is connected to a power source line of high level or low level, as with the P-type or N-type transistor.

Therefore, the output terminals for three or more control outputs can be formed with the collector (drain) of the N-type transistor, the collector (drain) of the P-type transistor, and the collector (drain) of the one or more first additional transistor. Logic for operations of the first additional transistor can be set in accordance with the DC source voltage, the input voltage supplied to the external input terminal, and the number of voltage decreasing means.

Accordingly, the input voltage supplied to the single external input terminal is switched among high potential, low potential, and intermediate potential, or among high potential, low potential, and open potential (high impedance), for example, whereby switching of the feedback resistors in the amplifier is performed in accordance with control outputs from the output terminals of the transistors. This enables switching among high gain, intermediate gain, and low gain. Also, in addition to the switching between the high gain and the low gain, switching to the standby mode in the circuit is possible. Thus, switching among three or more operating states can be performed in accordance with the input voltage supplied to the single external input terminal.

Still further, the foregoing decoder circuit may be arranged so as to further include: a first voltage-dividing circuit, standing between the external input terminal and the base (gate) of the P-type transistor, in which four or more voltage-dividing resistors are connected in series between the power source lines, the external input terminal is connected to a first contact of the voltage-dividing resistors, the base (gate) of the P-type transistor is connected via a bias resistor to a second contact of the voltage-dividing resistors, and the base (gate) of the N-type transistor is connected via a bias resistor to a third contact of the voltage-dividing resistors, the second contact having a voltage level higher than that of the first contact, the third contact having a voltage level lower than the first contact; one or more first additional transistor in which a base (gate) is connected via a bias resistor to a contact having a voltage level lower than the first contact; a second voltage-dividing circuit to which current taken in the P-type transistor is supplied; and one or more second additional transistor in which a base (gate) is connected via a bias resistor to a contact of voltage-dividing resistors of the second voltage-dividing circuit.

According to the above arrangement, the output terminals for three control outputs can be formed with the respective collectors (drains) of the first N-type transistor whose base (gate) is connected via the bias resistor to the second contact, the first additional transistor, and the second additional transistor (when one transistor is provided each for the first additional transistor and the second additional transistor). If the number of the first additional and second additional transistors is increased, the number of output terminals can be further increased. Logic for operations of the transistors can be set in accordance with the DC source voltage, the input voltage supplied to the external input terminal, a resistance division ratio of the first and second voltage-dividing circuits, and the values of the bias resistors.

Accordingly, the input voltage supplied to the single external input terminal is switched among high potential, low potential, and intermediate potential, or among high potential, low potential, and open potential (high impedance), for example, whereby switching of the feedback resistors in the amplifier is performed in accordance with control outputs from the output terminals of the transistors. This enables switching among high gain, intermediate gain, and low gain. Also, in addition to the switching between the high gain and the low gain, switching to the standby mode in the circuit is possible. Thus, switching among three or more operating states can be performed in accordance with the input voltage supplied to the single external input terminal.

Further, a photo-detecting amplifier circuit of the present invention for a disk recording/reproducing apparatus is arranged so as to be capable of switch function by means of the foregoing decoder circuit.

According to the above arrangement, it is possible to reduce the size of a chip and to realize a photo-detecting amplifier circuit being capable of switch function for switching to the standby mode.

Still further, an optical pickup of the present invention is arranged so as to include the foregoing photo-detecting amplifier circuit.

According to the above arrangement, it is possible to reduce the size of a chip and to realize an optical pickup including a photo-detecting amplifier circuit being capable of switch function for switching to the standby mode.

Further, a decoder circuit according to the present invention can be also expressed as follows. That is, a decoder circuit according to the present invention includes two switching elements different in On/Off characteristics. As to each of the switching elements, a proper voltage is supplied to one end of the switching element, and the other end is an output terminal. On/Off of this switching element is switched by an input voltage supplied from the outside of the decoder circuit. Being turned on, each of the switching elements outputs a voltage supplied thereto from the output terminal. Here, since the switching elements are different in On/Off characteristics, three or more states, as voltage levels obtained from the output terminals, can be obtained by properly setting the value of a supplied voltage. With this arrangement, a decoder circuit can be realized by two switching elements, and it is possible to reduce the size of a chip, as compared to the conventional arrangement.

The Embodiments and concrete examples of implementation discussed in the foregoing detailed explanation serve solely to illustrate the technical details of the present invention, which should not be narrowly interpreted within the limits of such Embodiments and concrete examples, but rather may be applied in many variations within the spirit of the present invention, provided such variations do not exceed the scope of the patent claims set forth below.

What is claimed is:

1. A decoder circuit mounted on an integrated circuit, the decoder circuit comprising:
   a single external input terminal configured to supply an input voltage for decoding by the decoder circuit into three or more control outputs;
   a P-type transistor comprising an emitter (source) connected to a power source line of a high level, a base (gate) connected to the external input terminal and a collector (drain) configured to be a first output terminal of a first control output;
   an N-type transistor comprising an emitter (source) connected to a power source line of a low level, a base (gate) connected to the external input terminal and a collector (drain) configured to be a second output terminal of a second control output;
   a voltage decreasing device one end of which is connected to the external input terminal; and
   a first additional transistor comprising a base (gate) connected to another end of the voltage decreasing device or to a connection point of the voltage decreasing device, an emitter (source) connected to the power source line of the high level or the low level, and a collector (drain) configured to be a third output terminal of a third control output.

2. The decoder circuit according to claim 1, further comprising:
a first voltage-dividing circuit connecting the external input terminal and the base (gate) of the P-type transistor and comprising four or more voltage-dividing resistors connected in series between the power source lines,
wherein the external input terminal is connected to a first connection point of the voltage-dividing resistors, the base (gate) of the P-type transistor is connected via a bias resistor to a second connection point of the voltage-dividing resistors, and the base (gate) of the N-type transistor is connected via a bias resistor to a third connection point of the voltage-dividing resistors, the second connection point is at a voltage level higher than the first connection point, and the third connection point is at a voltage level lower than the first connection point;
a first additional transistor comprising a base (gate) connected via a bias resistor to a connection point of the voltage-dividing resistors at a voltage level lower than the first connection point;
a second voltage-dividing circuit to which a current from the P-type transistor is supplied; and
a second additional transistor comprising a base (gate) connected via a bias resistor to a connection point of voltage-dividing resistors of the second voltage-dividing circuit.

3. A photo-detecting amplifier circuit for a disk recording/reproducing apparatus, being capable of switch function by means of a decoder circuit, the photo-detecting amplifier comprising:
a decoder circuit, mounted on an integrated circuit, comprising a P-type transistor, an N-type transistor, a voltage decreasing device and a first additional transistor, wherein the decoder circuit decodes an input voltage supplied to a single external input terminal into three or more control outputs and generates a first control output, a second control output and a third control output; and
an amplifier receiving the first and second control outputs
wherein the P-type transistor comprises an emitter (source) connected to a power source line of a high level, a base (gate) connected to the external input terminal and a collector (drain) configured to be a first output terminal of the first control output, and the N-type transistor comprises an emitter (source) connected to a power source line of a low level, a base (gate) connected to the external input terminal and a collector (drain) configured to be a second output terminal of the second control output,
wherein one end of the voltage decreasing device is connected to the external input terminal, and
wherein the first additional transistor comprises a base (gate) connected to another end of the voltage decreasing device or to a connection point of the voltage decreasing device, an emitter (source) connected to the power source line of the high level or the low level, and a collector (drain) configured to be a third output terminal of the third control output.

4. An optical pickup including a photo-detecting amplifier circuit for a disk recording/reproducing apparatus, being capable of switch function by means of a decoder circuit, the optical pickup comprising:
a decoder circuit, mounted on an integrated circuit, comprising a P-type transistors, an N-type transistor, a voltage decreasing device and a first additional transistor, wherein the decoder circuit decodes an input voltage supplied to a single external input terminal into three or more control outputs and generates a first control output, a second control output and a third control output;
an amplifier receiving the first and second control outputs and generating signals; and
an optical element responsive to one of the signals generated by the amplifier,
wherein the P-type transistor comprises an emitter (source) connected to a power source line of a high level, a base (gate) connected to the external input terminal and a collector (drain) configured to be a first output terminal of the first control output, and the N-type transistor comprises an emitter (source) connected to a power source line of a low level, a base (gate) connected to the external input terminal and a collector (drain) configured to be a second output terminal of the second control output,
wherein one end of the voltage decreasing device is connected to the external input terminal, and
wherein the first additional transistor comprises a base (gate) connected to another end of the voltage decreasing device or to a connection point of the voltage decreasing device, an emitter (source) connected to the power source line of the high level or the low level, and a collector (drain) configured to be a third output terminal of the third control output.

* * * * *